US012580831B2

(12) United States Patent
Wu et al.

(10) Patent No.: US 12,580,831 B2
(45) Date of Patent: Mar. 17, 2026

(54) REPORTING BASED ON COLLECTING AND MONITORING TRAFFIC ON NETWORK

(71) Applicant: Cisco Technology, Inc., San Jose, CA (US)

(72) Inventors: Stanley Wu, Shanghai (CN); Yuefeng Jiang, Shanghai (CN); Qiang Wang, Zhejiang (CN); Daemon Yang, LiaoNing (CN); Siwei Wu, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 315 days.

(21) Appl. No.: 18/351,139

(22) Filed: Jul. 12, 2023

(65) Prior Publication Data

US 2024/0348519 A1     Oct. 17, 2024

Related U.S. Application Data

(60) Provisional application No. 63/495,915, filed on Apr. 13, 2023.

(51) Int. Cl.
*H04L 43/065*     (2022.01)
*H04L 43/028*     (2022.01)
(52) U.S. Cl.
CPC .......... *H04L 43/065* (2013.01); *H04L 43/028* (2013.01)
(58) Field of Classification Search
CPC ............................ H04L 43/065; H04L 43/028
See application file for complete search history.

(56) References Cited

U.S. PATENT DOCUMENTS

| | | | |
|---|---|---|---|
| 11,876,693 B1 * | 1/2024 | Bello | H04L 43/065 |
| 2013/0159865 A1 | 6/2013 | Smith et al. | |
| 2014/0289405 A1 | 9/2014 | Tychon et al. | |
| 2018/0041390 A1 | 2/2018 | Saavedra | |
| 2019/0238421 A1 | 8/2019 | Kolar et al. | |
| 2020/0162337 A1 | 5/2020 | Jain et al. | |
| 2020/0162517 A1 * | 5/2020 | Wong | H04L 63/0236 |
| 2020/0274782 A1 | 8/2020 | Balaiah et al. | |
| 2021/0049078 A1 * | 2/2021 | Khan | G06F 11/073 |
| 2022/0046038 A1 * | 2/2022 | Sinha | G06F 11/3072 |
| 2024/0259286 A1 * | 8/2024 | Shah | H04L 43/026 |

FOREIGN PATENT DOCUMENTS

WO     WO-2024147372 A1 *     7/2024     ......... H04L 67/2871

* cited by examiner

*Primary Examiner* — Schquita D Goodwin
(74) *Attorney, Agent, or Firm* — Polsinelli P.C.

(57)     ABSTRACT

Disclosed are systems, apparatuses, methods, and computer-readable media for generating a report in response to detected conditions in a network environment. A method includes: generating one or more triggering policies; determining if the one or more of the triggering policies has been satisfied; starting a netflow process in response to the determination that the one or more of the trigger policies has been satisfied; collecting in real time data for connected devices that satisfy the one or more triggering policies; generating and saving a record associated with the collected data; generating a report based on analysis of the record; displaying a link to the report.

20 Claims, 5 Drawing Sheets

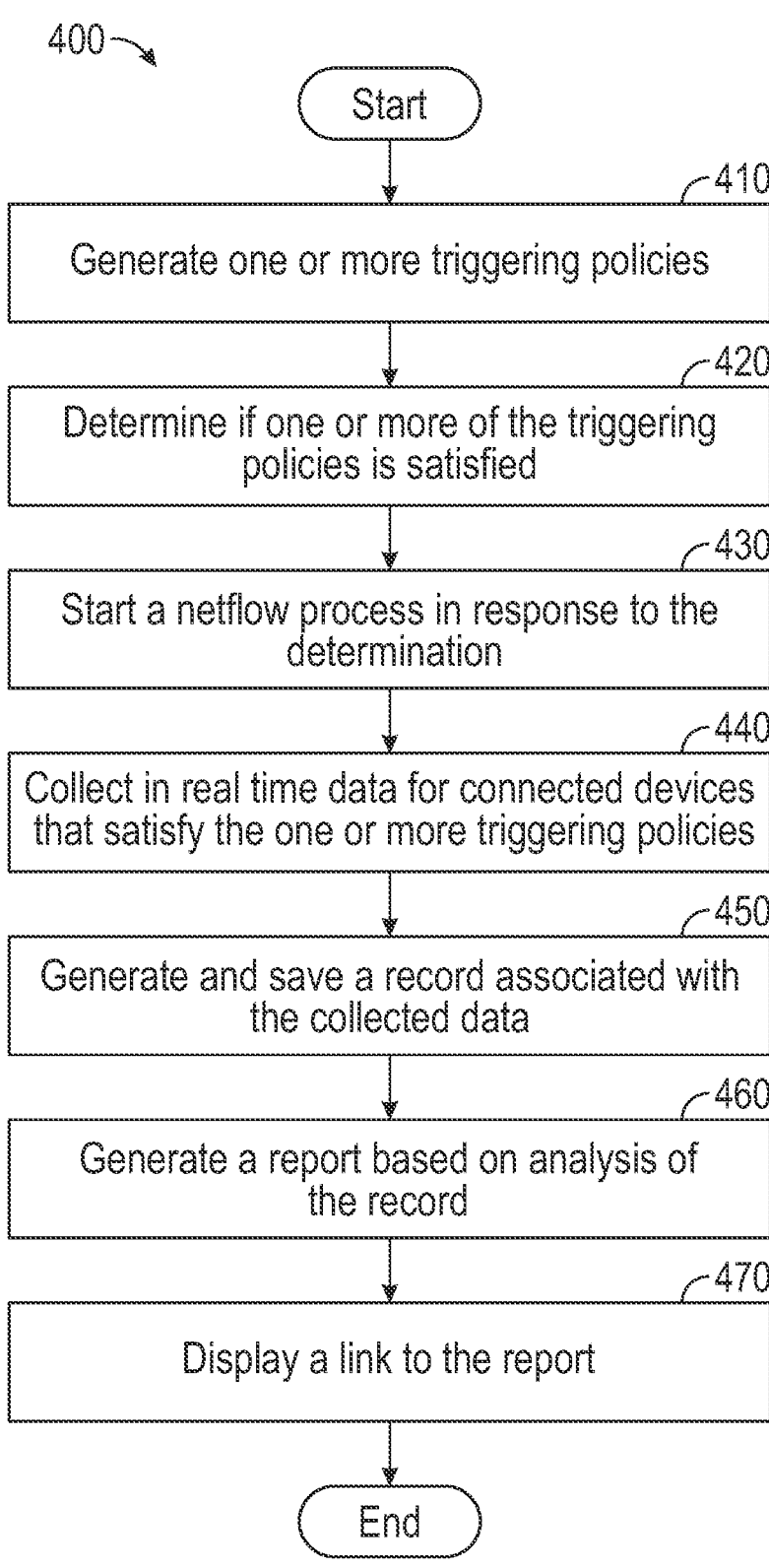

400

Start

410
Generate one or more triggering policies

420
Determine if one or more of the triggering policies is satisfied

430
Start a netflow process in response to the determination

440
Collect in real time data for connected devices that satisfy the one or more triggering policies 450
Generate and save a record associated with the collected data 460
Generate a report based on analysis of the record 470
Display a link to the report End

FIG. 4

REPORTING BASED ON COLLECTING AND MONITORING TRAFFIC ON NETWORK

CROSS-REFERENCE TO RELATED APPLICATIONS

This application claims priority to and benefit from U.S. Provisional Patent Application No. 63/495,915 filed on Apr. 13, 2023, which is expressly incorporated herein by reference.

BACKGROUND

Network devices such as routers and switches are used in directing and controlling network traffic. The network devices can be configured by one or more settings. The traffic is often directed as individual packets along a route from a source location to a destination location. The monitoring of traffic can be done in a passive form such that the operator of the network can have limited amounts of data on the traffic.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

FIG. 4 illustrates an example method for generating a report and/or alarm based on the network traffic;

DESCRIPTION

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Systems, methods, and computer-readable media are provided for generating a report and/or an alarm in response to detected conditions in a network environment. An example method can include generating one or more triggering policies; determining if the one or more of the triggering policies has been satisfied; starting a netflow process in response to the determination that the one or more of the trigger policies has been satisfied; collecting in real time data for connected devices that satisfy the one or more triggering policies; generating and saving a record associated with the collected data; generating a report based on analysis of the record; displaying an alarm including a link to the report.

An example system can include one or more processors and at least one computer-readable storage medium storing instructions which, when executed by the one or more processors, cause the one or more processors to generate one or more triggering policies; determine if the one or more of the triggering policies has been satisfied; start a netflow process in response to the determination that the one or more of the trigger policies has been satisfied; collect in real time data for connected devices that satisfy the one or more triggering policies; generate and saving a record associated with the collected data; generate a report based on analysis of the record; display an alarm including a link to the report.

An example non-transitory computer-readable storage medium having stored therein instructions which, when executed by a processor, cause the processor to generate one or more triggering policies; determine if the one or more of the triggering policies has been satisfied; start a netflow process in response to the determination that the one or more of the trigger policies has been satisfied; collect in real time data for connected devices that satisfy the one or more triggering policies; generate and saving a record associated with the collected data; generate a report based on analysis of the record; display an alarm including a link to the report.

Example Embodiments

Figure 1:
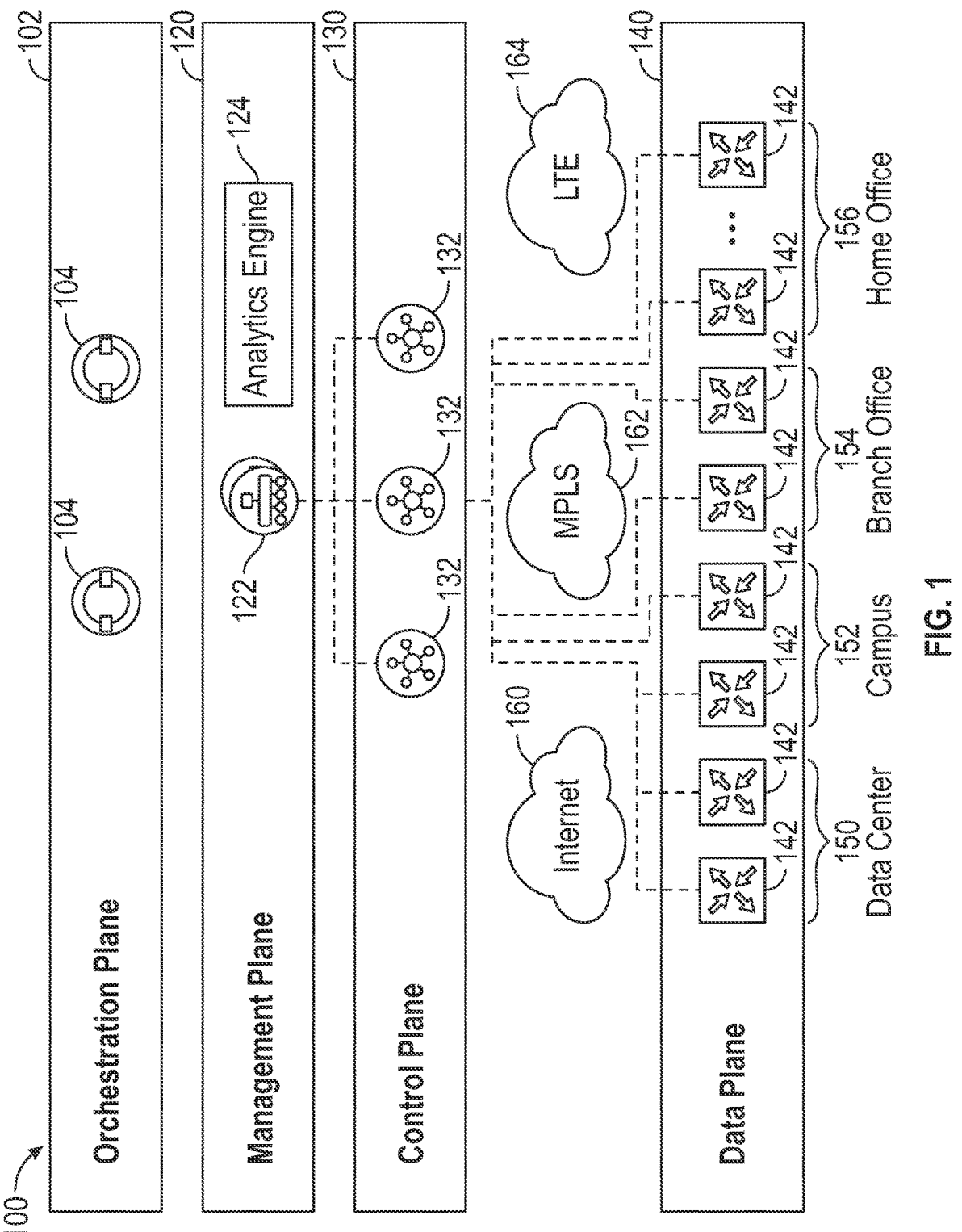
FIG. 1 illustrates an example of a high-level network architecture in accordance with some aspects of the disclosure.

FIG. 1 illustrates an example of a network architecture 100 for implementing aspects of the present technology. An example of an implementation of the network architecture 100 is the Cisco® SD-WAN architecture. However, one of ordinary skill in the art will understand that, for the network architecture 100 and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100 can comprise an orchestration plane 102, a management plane 120, a control plane 130, and a data plane 140. The orchestration plane can 102 assist in the automatic on-boarding of edge network devices 142 (e.g., switches, routers, etc.) in an overlay network. The orchestration plane 102 can include one or more physical or virtual network orchestrator appliances 104. The network orchestrator appliance(s) 104 can perform the initial authentication of the edge network devices 142 and orchestrate connectivity between devices of the control plane 130 and the data plane 140. In some embodiments, the network orchestrator appliance(s) 104 can also enable communication of devices located behind Network Address Translation (NAT). In some embodiments, physical or virtual Cisco® SD-WAN vBond appliances can operate as the network orchestrator appliance(s) 104.

The management plane 120 can be responsible for central configuration and monitoring of a network. The management plane 120 can include one or more physical or virtual network management appliances 122. In some embodiments, the network management appliance(s) 122 can provide centralized management of the network via a graphical user interface to enable a user to monitor, configure, and maintain the edge network devices 142 and links (e.g., Internet transport network 160, MPLS network 162, 4G/LTE network 164) in an underlay and overlay network. The network management appliance(s) 122 can support multitenancy and enable centralized management of logically isolated networks associated with different entities (e.g., enterprises, divisions within enterprises, groups within divisions, etc.). Alternatively or in addition, the network management appliance(s) 122 can be a dedicated network management system for a single entity. In some embodiments, physical or virtual Cisco® SD-WAN vManage appliances can operate as the network management appliance(s) 122.

The control plane 130 can build and maintain a network topology and make decisions on where traffic flows. The control plane 130 can include one or more physical or virtual network controller appliance(s) 132. The network controller appliance(s) 132 can establish secure connections to each network device 142 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network controller appliance(s) 132 can operate as route reflectors. The network controller appliance(s) 132 can also orchestrate secure connectivity in the data plane 140 between and among the edge network devices 142. For example, in some embodiments, the network controller appliance(s) 132 can distribute crypto key information among the network device(s) 142. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network controller appliance(s) 132.

The data plane 140 can be responsible for forwarding packets based on decisions from the control plane 130. The data plane 140 can include the edge network devices 142, which can be physical or virtual network devices. The edge network devices 142 can operate at the edges various network environments of an organization, such as in one or more data centers or colocation centers 150, campus networks 152, branch office networks 154, home office networks 154, and so forth, or in the cloud (e.g., Infrastructure as a Service (IaaS), Platform as a Service (PaaS), SaaS, and other cloud service provider networks). The edge network devices 142 can provide secure data plane connectivity among sites over one or more WAN transports, such as via one or more Internet transport networks 160 (e.g., Digital Subscriber Line (DSL), cable, etc.), MPLS networks 162 (or other private packet-switched network (e.g., Metro Ethernet, Frame Relay, Asynchronous Transfer Mode (ATM), etc.), mobile networks 164 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 142 can be responsible for traffic forwarding, security, encryption, quality of service (QOS), and routing (e.g., BGP, OSPF, etc.), among other tasks. In some embodiments, physical or virtual Cisco® SD-WAN vEdge routers can operate as the edge network devices 142.

Figure 2:
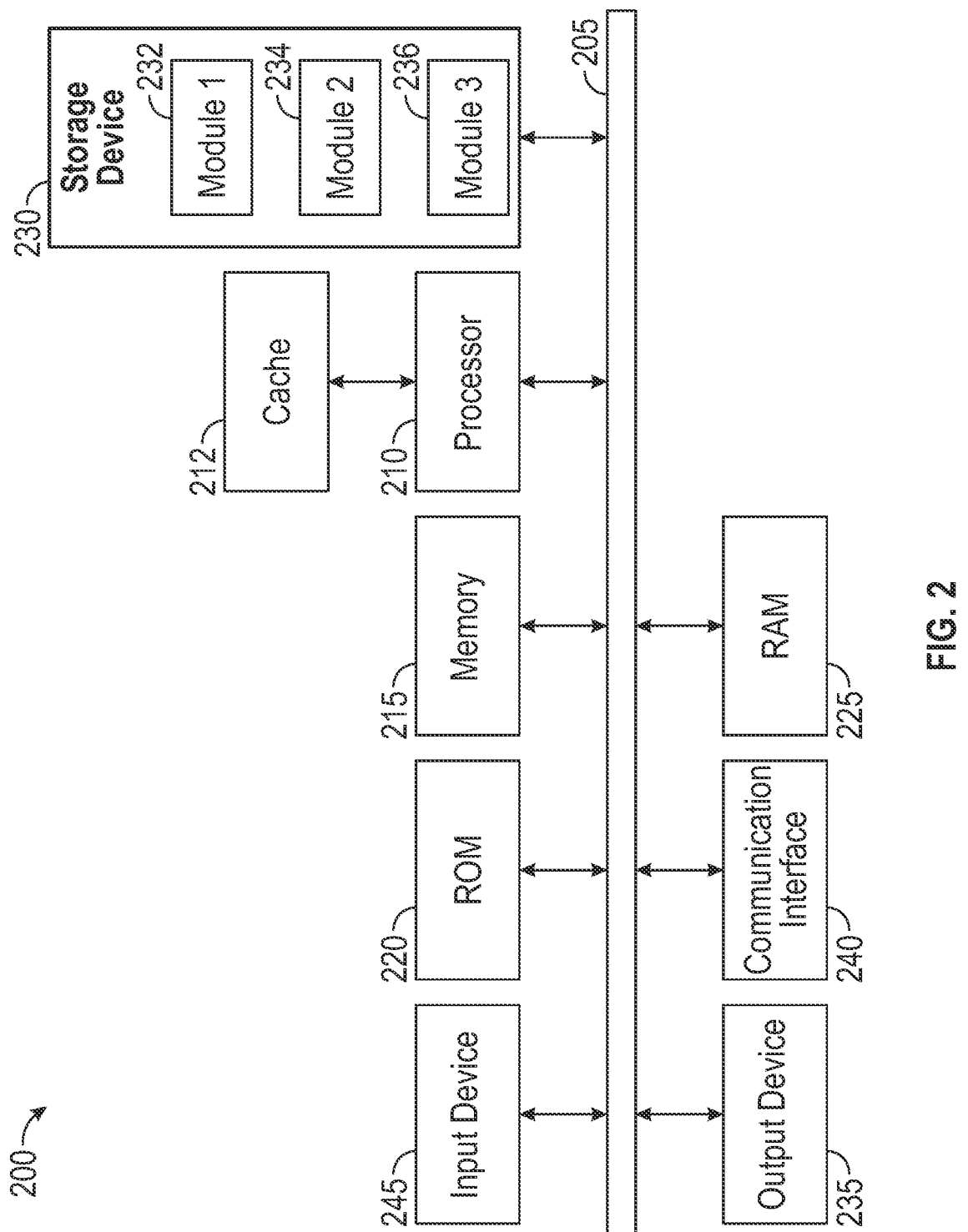
FIG. 2 shows an example of a computing system, which can be for example any computing device that can implement components of the system.

FIG. 2 shows an example of computing system 200, which can be for example any computing device making up a device with the network architecture 100 or any component thereof in which the components of the system are in communication with each other using connection 205. Connection 205 can be a physical connection via a bus, or a direct connection into processor 210, such as in a chipset architecture. Connection 205 can also be a virtual connection, networked connection, or logical connection.

In some embodiments computing system 200 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 200 includes at least one processing unit (CPU or processor) 210 and connection 205 that couples various system components including system memory 215, such as read only memory (ROM) 220 and random access memory (RAM) 225 to processor 210. Computing system 200 can include a cache of high-speed memory 212 connected directly with, in close proximity to, or integrated as part of processor 210.

Processor 210 can include any general purpose processor and a hardware service or software service, such as services 232, 234, and 236 stored in storage device 230, configured to control processor 210 as well as a special-purpose processor where software instructions are incorporated into the actual processor design. Processor 210 may essentially be a completely self-contained computing system, containing multiple cores or processors, a bus, memory controller, cache, etc. A multi-core processor may be symmetric or asymmetric.

To enable user interaction, computing system 200 includes an input device 245, which can represent any number of input mechanisms, such as a microphone for speech, a touch-sensitive screen for gesture or graphical input, keyboard, mouse, motion input, speech, etc. Computing system 200 can also include output device 235, which can be one or more of a number of output mechanisms known to those of skill in the art. In some instances, multimodal systems can enable a user to provide multiple types of input/output to communicate with computing system 200. Computing system 200 can include communications interface 240, which can generally govern and manage the user input and system output. There is no restriction on operating on any particular hardware arrangement and therefore the basic features here may easily be substituted for improved hardware or firmware arrangements as they are developed.

Storage device 230 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 230 can include software services, servers, services, etc., that when the code that defines such software is executed by the processor 210, it causes the system to perform a function. In some embodiments, a hardware service that performs a particular function can include the software component stored in a computer-readable medium in connection with the necessary hardware components, such as processor 210, connection 205, output device 235, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Figure 3:
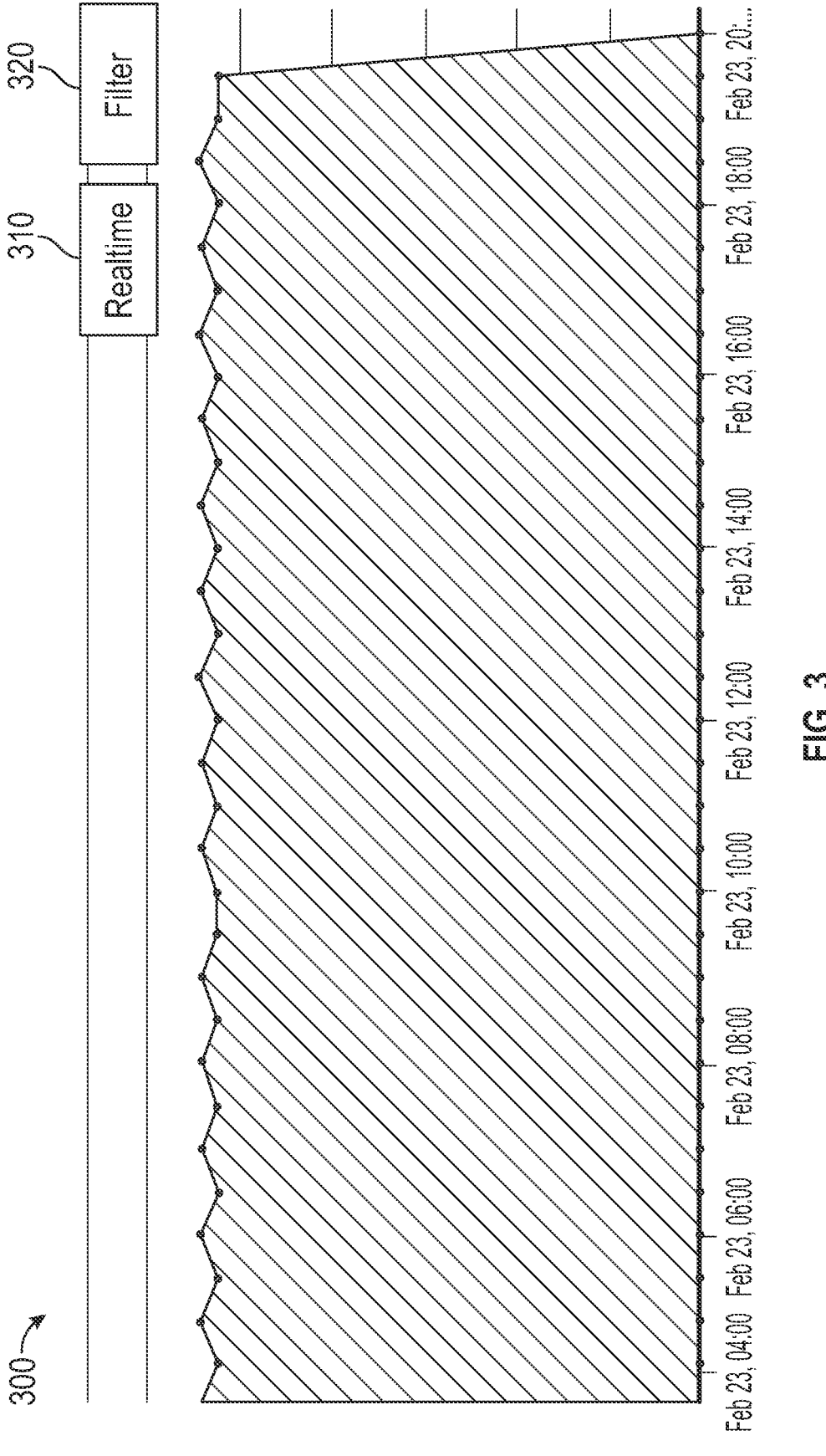
FIG. 3 illustrates an example screen of a system in accordance with some aspects of the disclosure.

FIG. 3 illustrates control screen page 300, such as a SD-WAN Application Intelligence Engine Flow (SAIE) home screen. The control screen page 300 allows for a user to control and receive information regarding the SD-WAN as described above in relation to FIGS. 1 and 2. The control screen page 300 can include a launch button 310. The launch button can be a "realtime" button to trigger the on-demand netflow as presented herein. Once a user selects the launch button 310, the system and the method as presented herein can begin operation. Additionally, a "filter" button 320 can also be provided. The filter button can be used to create customized filters, select one or more default filters, and/or reset the filters to the one or more default filters. The selection of the one or more of the customized filters and/or the one or more default filters can start a realtime netflow.

FIG. 4 illustrates a flow chart 400 corresponding to an example method. In at least one example, the method 400 illustrated in FIG. 4 can also be described as an on demand netflow method. The method can be characterized through the trigger condition such that the on demand netflow is triggers manually in that the user has to enable it on demand. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

For example, the system and/or apparatus can be used to generate a report and/or alarm in response to detected conditions in the network environment. The generation of the report and/or can be managed by the processor 210 of FIG. 2. In at least one example, the processor 210 can be on the network controller appliance(s) 132.

According to some examples, the method 400 includes generating one or more triggering policies at block 410. For example, the processor 210 illustrated in FIG. 2 may generate one or more triggering policies. The triggering policies may include an operator entered code, a selection of a button, or other item to indicate that a policy is to be triggered. In other examples, the generation of the trigger can be a selection on a main page of a management tool that in turn selections one or more filters. The one or more filters can be automatically selected based on the most frequently used applications. Additionally, the filter can be based on predetermined criteria. In yet other examples, the filters can be based on user defined filters that include one or more of client information, virtual private network, application name, and the like. In another example, the triggering policies include one or more of conditions: bidirectional forwarding detection, quality of service drop, SLA violoation, application QOE violations, abnormal signaling, alarm detection by one or more analysis tools, event detection by one or more analysis tools, and/or site QOE violations. In at least one example, each of the conditions is paired with one of a plurality of filters.

According to some examples, the method 400 includes determining if the one or more of the triggering policies has been satisfied at block 420. For example, the processor 210 illustrated in FIG. 2 may determine if the one or more of the triggering policies has been satisfied. The determination can be made during the operation of the individual applications running on the network architecture 100.

According to some examples, the method 400 includes starting a netflow process in response to the determination that the one or more of the trigger policies has been satisfied at block 430. For example, the processor 210 illustrated in FIG. 2 may start a netflow process in response to the determination that the one or more of the trigger policies has been satisfied. The netflow process may be an on-demand netflow process. In at least one example, the on-demand netflow process can be started along with the generation of the one or more triggering polices. In at least one example, an alarm can be the one or more trigger policies that launches the on-demand netflow process. Other policies as described herein can be used as well.

According to some examples, the method 400 includes collecting in real time data for connected devices that satisfy the one or more triggering policies at block 440. For example, the processor 210 illustrated in FIG. 2 may collect in real time data for connected devices that satisfy the one or more triggering policies. Additionally, the method 400 can also include generating a record in high queue at block 440.

According to some examples, the method 400 includes generating and saving a record associated with the collected data at block 450. For example, the processor 210 illustrated in FIG. 2 may generate and saving a record associated with the collected data.

According to some examples, the method 400 includes generating a report based on analysis of the record at block 460. For example, the processor 210 illustrated in FIG. 2 may generate a report based on analysis of the record. In at least one example, the record is placed into a high queue that only contains items that are part of the on-demand netflow process. Additionally, the method may include generating a low queue that contains other netflow processes beyond the on-demand netflow process. The high queue is processed faster and more frequently than the low queue. In at least one example, the high queue is generated in less than a minute. In yet another example, the high queue is processed in near realtime such that it is processed in less than 10 seconds.

According to some examples, the method 400 includes displaying a link to the report at block 470. For example, the processor 210 illustrated in FIG. 2 may displaying a link to the report. In yet other examples, the method 400 includes displaying an alarm including a link to the report. The link to the report can be located on the main page of the management tool such as the one illustrated in FIG. 3.

Figure 5:
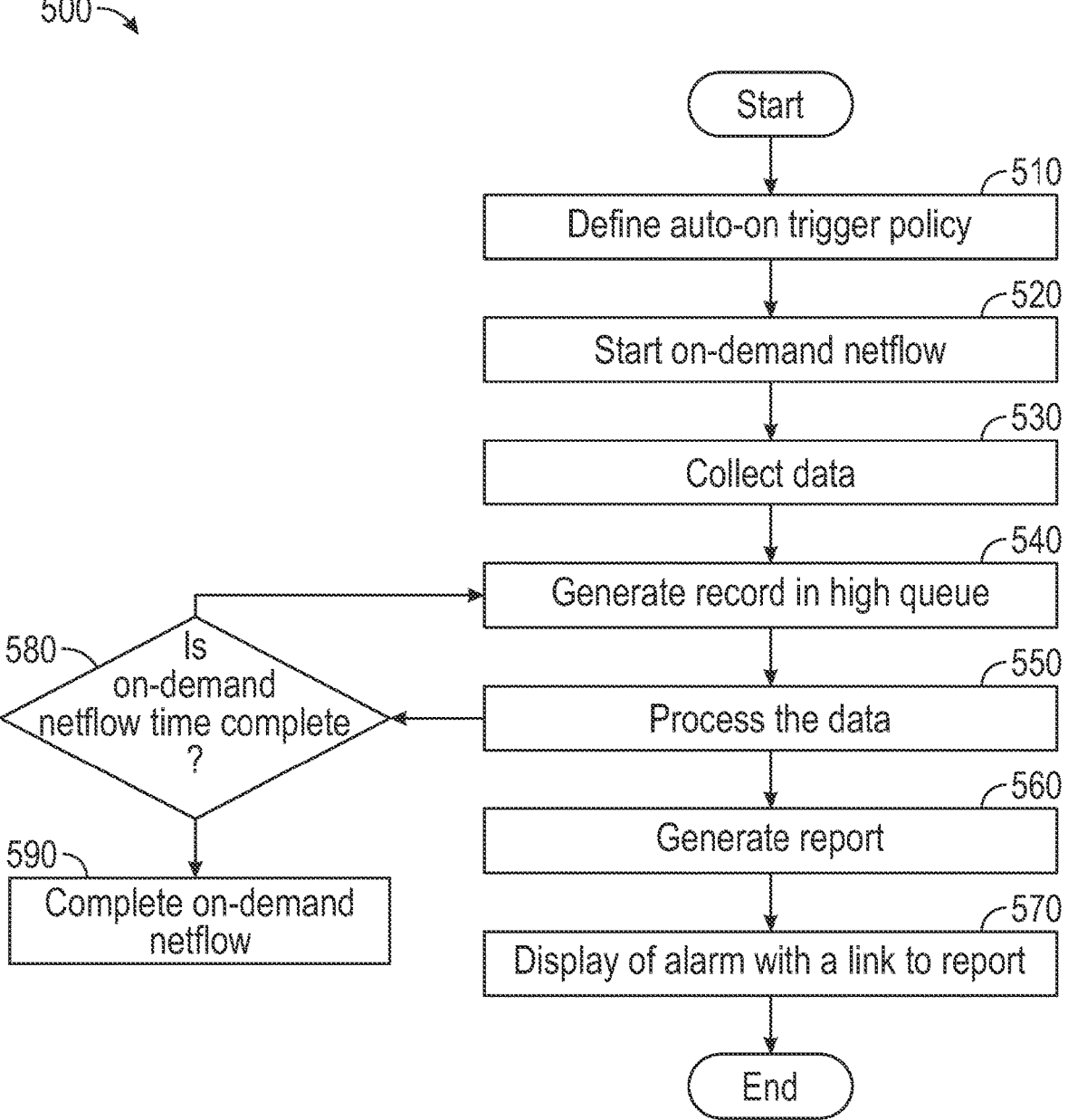
FIG. 5 illustrates another example method for generating a report and/or alarm based on the network traffic.

FIG. 5 illustrates a flow chart 500 corresponding to an example method. In at least one example, the method as illustrated in FIG. 5 can be described as an auto-on netflow method. Although the example method 500 depicts a particular sequence of operations, the sequence may be altered without departing from the scope of the present disclosure. For example, some of the operations depicted may be performed in parallel or in a different sequence that does not materially affect the function of the method 500. In other examples, different components of an example device or system that implements the method 500 may perform functions at substantially the same time or in a specific sequence.

For example, the system and/or apparatus can be used to generate a report and/or alarm in response to detected conditions in the network. The generation of the report and/or can be managed by the processor 210 of FIG. 2. In at least one example, the processor 210 can be on the network controller appliance(s) 132. Additionally, the method 500 can be combined with the method 400 where one or more of the steps illustrated can be included within one or more of the other steps and/or replace the steps.

According to some examples, the method 500 includes defining an auto-on trigger policy at block 510. For example, the processor 210 illustrated in FIG. 2 define an auto-on trigger policy. The auto-on trigger policy can be activated by an operator entered code, a selection of a button, or other item to indicate that a policy is to be triggered. In other examples, the defining of the auto-on trigger policy can be in response to a selection on a main page of a management tool. The triggering policies may include one or more of conditions: bidirectional forwarding detection, quality of service drop, SLA violoation, application QOE violations, abnormal signaling, alarm detection by one or more analysis tools, event detection by one or more analysis tools, and/or site QOE violations. The auto-on trigger policy can include setting one or more of a condition, filter, and/or action. The filter can include the one or more of the triggering polices described herein. For example, when a condition as described herein in encountered, the process starts an automatic-on netflow with the filters as set or predefined. In one example, if application QOE violations are detected and an alarm is triggered on a vpn running at a particular service, then the automatic-on netwflow with the vpn can be automatically started on this device.

According to some examples, the method 500 includes starting an on-demand netflow at block 520. For example, the processor 210 illustrated in FIG. 2 starts an on-demand netflow.

According to some examples, the method 500 includes collecting data at block 530. For example, the processor 210 illustrated in FIG. 2 collects data. The collection of data can be in response to one or more filters that are activated. The collection of data can be based upon one or more of the filters and conditions that are set forth above.

According to some examples, the method 500 includes generating a record in high queue at block 540. For example, the processor 210 illustrated in FIG. 2 generates a record in high queue. High queue may only contain items that are part of the on-demand netflow process. The remaining flows are processed and placed into a low queue. The high queue is processed faster and more frequently than the low queue. In at least one example, the high queue is generated in less than a minute. In yet another example, the high queue is processed in near realtime such that it is processed in less than 10 seconds.

According to some examples, the method 500 includes processing the data at block 550. For example, the processor 210 illustrated in FIG. 2 processes the data. In at least one example, vManage appliance can be the device that is processing the data. Additionally, the data can be saved in a database. Furthermore, the database can be configured with artificial intelligence that can assist in processing the data as well. Artificial intelligence can include a machine learning model, a learning process model, and/or other artificial intelligence based learning techniques including but not limited to clustering and aggregation.

According to some examples, the method 500 includes generating a report at block 560. For example, the processor 210 illustrated in FIG. 2 generates the report. The report in at least one example may be generated by the artificial intelligence tool running on the database.

According to some examples, the method 500 includes displaying of an alarm with a link to the report at block 570. For example, the processor 210 illustrated in FIG. 2 transmits data to a display to display of an alarm with link to the report. The link to the report can be located on the main page of the management tool such as the one illustrated in FIG. 3. The report link can be displayed in a trigger condition list. Additionally, the method can include generating an alarm and displaying a link to the report in association with the alarm. The alarm can be displayed on the main page or in a separate alarm and/or event page of management tool.

Additionally, the method 500 may optionally include a determination if the on-demand netflow time requirement is complete at block 580. For example, the processor 210 illustrated in FIG. 2 determines if the on-demand netflow time requirement is complete. The determination is based upon when a predetermined monitor time has been set and it has expired. Once the determination is made the monitor stops and notifies vManage and/or the controller.

According to some examples, the method 500 includes completing the on-demand netflow at block 590. For example, the processor 210 illustrated in FIG. completes the on-demand netflow.

Aspect 1. A method of generating a report in response to detected conditions in a network environment, the method comprising: generating one or more triggering policies; determining if the one or more of the triggering policies has been satisfied; starting a netflow process in response to the determination that the one or more of the trigger policies has been satisfied; collecting in real time data for connected devices that satisfy the one or more triggering policies; generating and saving a record associated with the collected data; generating a report based on analysis of the record; displaying a link to the report. In one or more aspects described herein, the method can also include displaying an alarm with a link to the report.

Aspect 2. The method of Aspect 1, wherein the netflow process is an on-demand netflow process.

Aspect 3. The method of any of Aspects 1 to 2, wherein the record is placed into a high queue that only contains items that are part of the on-demand netflow process.

Aspect 4. The method of any of Aspects 1 to 3, further comprising generating a low queue that contains other netflow processes beyond the on-demand netflow process.

Aspect 5. The method of any of Aspects 1 to 4, where the high queue is processed faster and more frequently than the low queue.

Aspect 6. The method of any of Aspects 1 to 5, wherein the high queue is generated in less than a minute.

Aspect 7. The method of any of Aspects 1 to 6, wherein the triggering policies include one or more of conditions: bidirectional forwarding detection, quality of service drop, SLA violoation, application QOE violations; and or site QOE violations.

Aspect 8. The method of any of Aspects 1 to 7, wherein each of the conditions is paired with one of a plurality of filters.

Aspect 9. A system includes a storage (implemented in circuitry) configured to store instructions and a processor. The processor configured to execute the instructions and cause the processor to: generate one or more triggering policies; determining if the one or more of the triggering policies has been satisfied; start a netflow process in response to the determination that the one or more of the trigger policies has been satisfied; collect in real time data for connected devices that satisfy the one or more triggering policies; generate and saving a record associated with the collected data; generate a report based on analysis of the record; display a link to the report. In one or more aspects described herein, the system can also include displaying an alarm with a link to the report.

Aspect 10. The system of Aspect 9, wherein the netflow process is an on-demand netflow process.

Aspect 11. The system of any of Aspects 9 to 10, wherein the record is placed into a high queue that only contains items that are part of the on-demand netflow process.

Aspect 12. The system of any of Aspects 9 to 11, wherein the processor is configured to execute the instructions and cause the processor to: generate a low queue that contains other netflow processes beyond the on-demand netflow process.

Aspect 13. The system of any of Aspects 9 to 12, wherein the processor is configured to process the high queue faster and more frequently than the low queue.

Aspect 14. The system of any of Aspects 9 to 13, wherein the high queue is generated in less than a minute.

Aspect 15. The system of any of Aspects 9 to 14, wherein the triggering policies include one or more of conditions: bidirectional forwarding detection, quality of service drop, SLA violoation, application QOE violations; and or site QOE violations.

Aspect 16. The system of any of Aspects 9 to 15, wherein each of the conditions is paired with one of a plurality of filters.

Aspect 17. A computer readable medium comprising instructions using a computer system. The computer includes a memory (e.g., implemented in circuitry) and a processor (or multiple processors) coupled to the memory. The processor (or processors) is configured to execute the computer readable medium and cause the processor to: generating one or more triggering policies; determining if the one or more of the triggering policies has been satisfied; start a netflow process in response to the determination that the one or more of the trigger policies has been satisfied; collect in real time data for connected devices that satisfy the one or more triggering policies; generate and saving a record associated with the collected data; generate a report based on analysis of the record; display a link to the report. In one or more aspects described herein, the computer readable medium can also include displaying an alarm with a link to the report.

Aspect 18. The computer readable medium of Aspect 17, wherein the netflow process is an on-demand netflow process.

Aspect 19. The computer readable medium of any of Aspects 17 to 18, wherein the record is placed into a high queue that only contains items that are part of the on-demand netflow process.

Aspect 20. The computer readable medium of any of Aspects 17 to 19, wherein the processor is configured to execute the computer readable medium and cause the processor to: generate a low queue that contains other netflow processes beyond the on-demand netflow process.

Aspect 21. The computer readable medium of any of Aspects 17 to 20, wherein the processor is configured to execute the computer readable medium and cause the processor to:

Aspect 22. The computer readable medium of any of Aspects 17 to 21, wherein the high queue is generated in less than a minute.

Aspect 23. The computer readable medium of any of Aspects 17 to 22, wherein the triggering policies include one or more of conditions: bidirectional forwarding detection, quality of service drop, SLA violoation, application QOE violations; and or site QOE violations.

Aspect 24. The computer readable medium of any of Aspects 17 to 23, wherein each of the conditions is paired with one of a plurality of filters.

What is claimed is:

1. A method of generating a report in response to detected conditions in a network environment, the method comprising:

generating one or more triggering policies;
   determining if the one or more of the triggering policies has been satisfied;
   starting an on-demand process in response to the determination that the one or more of the trigger policies has been satisfied;
   in response to the on-demand process starting, collecting in real time data for connected devices that satisfy the one or more triggering policies;
   generating and saving one or more records associated with the collected data, wherein the one or more records are placed into a high queue that when part of the ondemand process, and other processes beyond the on-demand process are placed in a low queue;
   generating a report based on analysis of the one or more records stored in the high queue; and
   displaying a link to the report.

2. The method of claim 1, where the high queue is processed faster and more frequently than the low queue.

3. The method of claim 1, wherein the high queue is generated in less than a minute.

4. The method of claim 1, wherein the one or more triggering policies include one or more of conditions: bidirectional forwarding detection, quality of service drop, SLA violation, application QOE violations; and or site QOE violations.

5. The method of claim 4, wherein each of the conditions is paired with one of a plurality of filters.

6. The method of claim 1, wherein generating one or more triggering policies comprises:

receiving a selection of one or more user-defined filters; and
   automatically applying the selected user-defined filters to configure the real time data collection for connected devices that satisfy the one or more triggering policies.

7. The method of claim 1, further comprising displaying an alarm in conjunction with the link to the report, wherein the alarm and link are located on a main page of a management tool.

8. A system comprising:

a storage configured to store instructions; and
   a processor configured to execute the instructions and cause the processor to:
      generate one or more triggering policies;
      determine if the one or more of the triggering policies has been satisfied;
      start an on-demand process in response to the determination that the one or more of the trigger policies has been satisfied;
      in response to the on-demand process starting, collect in real time data for connected devices that satisfy the one or more triggering policies;

generate and saving one or more a records associated with the collected data, wherein the one or more records are placed into a high queue that when part of the on-demand process, and other processes beyond the on-demand process are placed in a low queue;
      generate a report based on analysis of the one or more records stored in the high queue; and
      display a link to the report.

9. The system of claim 8, wherein the processor is configured to process the high queue faster and more frequently than the low queue.

10. The system of claim 8, wherein the high queue is generated in less than a minute.

11. The system of claim 8, wherein the one or more triggering policies include one or more of conditions: bidirectional forwarding detection, quality of service drop, SLA violation, application QOE violations; and or site QOE violations.

12. The system of claim 11, wherein each of the conditions is paired with one of a plurality of filters.

13. The system of claim 8, wherein the processor is configured to generate the one or more triggering policies by:

receiving a selection of one or more user-defined filters; and
   automatically applying the selected user-defined filters to configure the real time data collection for connected devices that satisfy the one or more triggering policies.

14. The system of claim 8, wherein the processor is configured to display an alarm in conjunction with the link to the report, wherein the alarm and link are located on a main page of a management tool.

15. A non-transitory computer readable medium comprising instructions, the instructions, when executed by a computing system, cause the computing system to:

generating one or more triggering policies;
   determining if the one or more of the triggering policies has been satisfied;
   start an on-demand process in response to the determination that the one or more of the trigger policies has been satisfied;
   in response to the on-demand process starting, collect in real time data for connected devices that satisfy the one or more triggering policies;
   generate and saving one or more a-records associated with the collected data, wherein the one or more records are placed into a high queue that when part of the on-demand process, and other processes beyond the on-demand process are placed in a low queue;
   generate a report based on analysis of the one or more records stored in the high queue; and
   display a link to the report.

16. The non-transitory computer readable medium of claim 15, further comprising instructions which when executed by the computing system, cause the computing system to process the high queue faster and more frequently than the low queue.

17. The non-transitory computer readable medium of claim 15, wherein the high queue is generated in less than a minute.

18. The non-transitory computer readable medium of claim 15, wherein the triggering policies include one or more of conditions: bidirectional forwarding detection, quality of service drop, SLA violation, application QOE violations; and or site QOE violations.

19. The non-transitory computer readable medium of claim 18, wherein each of the conditions is paired with one of a plurality of filters.

20. The non-transitory computer readable medium of claim 15, further comprising instructions which when executed by the computing system, cause the computing system to:

receive a selection of one or more user-defined filters; and automatically apply the selected user-defined filters to configure the real time data collection for connected devices that satisfy the one or more triggering policies.

\* \* \* \* \*